(12) United States Patent
Yanai

(10) Patent No.: US 6,756,916 B2
(45) Date of Patent: Jun. 29, 2004

(54) VEHICLE SURROUNDING CIRCUMSTANCE DISCRIMINATING SYSTEM, VEHICLE SURROUNDING MONITORING SYSTEM AND VEHICLE OBSTACLE WARNING SYSTEM AND RELATED METHODS

(75) Inventor: Tatsumi Yanai, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 104 days.

(21) Appl. No.: 10/067,306

(22) Filed: Feb. 7, 2002

(65) Prior Publication Data

US 2002/0110261 A1 Aug. 15, 2002

(30) Foreign Application Priority Data

Feb. 14, 2001 (JP) ...................................... P2001-036829

(51) Int. Cl.[7] .................................................. G08G 1/00
(52) U.S. Cl. ...................... 340/936; 340/438; 340/439; 340/441; 348/148
(58) Field of Search ................................ 340/936, 988, 340/438, 439, 441, 436; 348/148, 159

(56) References Cited

U.S. PATENT DOCUMENTS 5,357,438 A * 10/1994 Davidian .................... 340/436
5,521,580 A 5/1996 Kaneko et al.

FOREIGN PATENT DOCUMENTS

| DE | 3810840 | 11/1989 |
| JP | 11-220726 | 8/1999 |
| WO | WO 89/09015 | 10/1989 |

\* cited by examiner

Primary Examiner—Julie Lieu
(74) Attorney, Agent, or Firm—McDermott, Will & Emery

(57) ABSTRACT

Systems and methods for discriminating a vehicle surrounding circumstance for monitoring the vehicle surrounding and for warning an obstacle present around the vehicle surrounding are disclosed wherein each system has a vehicle speed detecting unit (12) detecting a vehicle speed, an action detecting unit (14, 16, 38, 20) detecting a driver's action, and a vehicle surrounding circumstance discriminating unit (20) discriminating a good or bad visibility around the vehicle surrounding on the basis of the vehicle speed and the driver's action, thereby enabling a discrimination for the good or bad visibility in the vehicle surrounding at an intersecting point or at a pedestrian crossing on the basis of the vehicle speed and the driver's action.

24 Claims, 10 Drawing Sheets

VEHICLE SURROUNDING CIRCUMSTANCE DISCRIMINATING SYSTEM, VEHICLE SURROUNDING MONITORING SYSTEM AND VEHICLE OBSTACLE WARNING SYSTEM AND RELATED METHODS

BACKGROUND OF THE INVENTION

The present invention relates to a discrimination system for discriminating a good or bad visibility area around a vehicle surrounding.

As disclosed in Japanese Patent Provisional Publication No. 11-220726, an attempt has been made to develop a vehicle surrounding monitor system which provides a display of image of right and left areas ahead of a vehicle over a monitor mounted in a vehicle compartment in response to an operating signal delivered from a turn signal switch and an obstacle detection signal delivered from a corner sensor which detects an obstacle present in the right and left areas ahead of the vehicle.

SUMMARY OF THE INVENTION

However, since the vehicle surrounding monitoring system of the related art is arranged such that image of the vehicle surrounding is automatically displayed over a monitor merely in response to the activating signals delivered from the turn signal switch and the corner sensor without discriminating the good or bad visibility area around the vehicle surrounding, the vehicle surrounding system encounters an issue wherein surrounding image is inevitably displayed over the monitor at all times even in the presence of a good visibility area that does not require the display of surrounding image.

It is therefore an object of the present invention to provide a vehicle surrounding circumstance discriminating system, a vehicle surrounding monitoring system and a vehicle obstacle monitoring system and related methods by which the above issues are addressed.

According to a first aspect of the present invention, there is provided a vehicle surrounding circumstance discriminating system for a vehicle, comprising: a vehicle speed detection unit detecting a vehicle speed; an action detecting unit detecting a driver's action; and a surrounding circumstance discriminating unit discriminating a good or bad visibility area around a vehicle surrounding on the basis of the vehicle speed and the driver's action.

According to a second aspect of the present invention, there is provided a vehicle surrounding monitoring system for a vehicle, comprising: a vehicle surrounding circumstance discriminating system including a vehicle speed detection unit detecting a vehicle speed, an action detecting unit detecting a driver's action, and a surrounding circumstance discriminating unit discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action; an image taking up unit taking up image of the vehicle surrounding in a dead angle of a driver; a display unit providing a display of image of the vehicle surrounding taken up with said image taking up unit; and a control unit operative to cause said display unit to provide the display of image taken up with said image taking up unit when said surrounding circumstance discriminating unit discriminates that the vehicle travels across the poor visibility area.

According to a third aspect of the present invention, there is provided a vehicle surrounding monitoring system for a vehicle, comprising: a vehicle surrounding circumstance discriminating system including a vehicle speed detection unit detecting a vehicle speed, an action detecting unit detecting a driver's action, and a surrounding circumstance discriminating unit discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action; an image taking up unit taking up image of the vehicle surrounding in a dead angle of a driver; a display unit providing a display of image of the vehicle surrounding taken up with said image taking up unit; a current vehicle position detecting unit detecting a current vehicle position; a memory unit storing a particular location of the poor visibility area detected with said current vehicle position detection unit when said surrounding circumstance discriminating unit discriminates that the vehicle travels across the poor visibility area; and a control unit operative to cause said image taking up unit to take up image and to cause the display unit to provide the display of image in response to the vehicle arriving at the particular location stored in said memory unit.

According to a fourth aspect of the present invention, there is provided a vehicle obstacle warning system, comprising: a vehicle surrounding circumstance discriminating system including a vehicle speed detection unit detecting a vehicle speed, an action detecting unit detecting a driver's action, and a surrounding circumstance discriminating unit discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action; an obstacle detecting unit detecting an obstacle present around the vehicle surrounding; a warning unit issuing a warning signal upon detection of said obstacle; and a control unit operative to cause said obstacle detecting unit to detect said obstacle and to cause said warning unit to issue said warning signal when said surrounding circumstance discriminating unit discriminates that the vehicle travels across the poor visibility area.

According to a fifth aspect of the present invention, there is provided a vehicle surrounding circumstance discriminating system for a vehicle, comprising: means for detecting a vehicle speed; means for detecting a driver's action; and means for discriminating a good or bad visibility area around a vehicle surrounding on the basis of the vehicle speed and the driver's action.

According to a sixth aspect of the present invention, there is provided a vehicle surrounding monitoring system for a vehicle, comprising: a vehicle surrounding circumstance discriminating unit including means for detecting a vehicle speed, means for detecting a driver's action, and means for discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action; means for taking up image of the vehicle surrounding in a dead angle of a driver; display means for providing a display of image of the vehicle surrounding taken up with said image taking up unit; and control means operative to cause said display means to provide the display of image taken up with said image taking up means when said surrounding circumstance discriminating unit discriminates that the vehicle travels across the poor visibility area.

According to a seventh aspect of the present invention, there is provided a vehicle surrounding monitoring system for a vehicle, comprising: a vehicle surrounding circumstance discriminating unit including means for detecting a vehicle speed, means for detecting a driver's action, and means for discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action; means for taking up image of the vehicle surrounding in a dead angle of a driver; display means for providing a display of image of the vehicle surrounding taken up with said image taking up means; means for detecting a current vehicle position; means for storing a particular location of the poor visibility area detected with said current vehicle position detection means when said surrounding circumstance discriminating unit discriminates that the vehicle travels across the poor visibility area; and control means operative to cause said image taking up means to take up image and to cause the display means to provide the display of image in response to the vehicle arriving at the particular location stored in said memory means.

According to an eighth aspect of the present invention, there is provided a vehicle obstacle warning system, comprising: a vehicle surrounding circumstance discriminating unit including means for detecting a vehicle speed, means for detecting a driver's action, and means for discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action; means for detecting an obstacle present around the vehicle surrounding; means for issuing a warning signal upon detection of said obstacle; and control means operative to cause said obstacle detecting means to detect said obstacle and to cause said warning signal issuing means to issue said warning signal when said surrounding circumstance discriminating unit discriminates that the vehicle travels across the poor visibility area.

According to a ninth aspect of the present invention, there is provided a method of discriminating a vehicle surrounding circumstance, comprising: detecting a vehicle speed; detecting a driver's action; and discriminating a good or bad visibility area around a vehicle surrounding on the basis of the vehicle speed and the driver's action.

According to an tenth aspect of the present invention, there is provided a method of monitoring a vehicle surrounding, comprising: detecting a vehicle speed; detecting a driver's action; discriminating a good or bad visibility area around a vehicle surrounding on the basis of the vehicle speed and the driver's action when a vehicle travels across a poor visibility area upon detection of the vehicle speed decreasing below a given value and upon detection of the driver's action being aligned with a given action; taking up image of the vehicle surrounding in a dead angle of a driver; providing a display of image of the vehicle surrounding taken up in said image taking up step; and controlling said image taking up step to be executed and said displaying step to be initiated for the display of image taken up in said image taking up step when said discriminating step discriminates that the vehicle travels across the poor visibility area.

According to a eleventh aspect of the present invention, there is provided a method of monitoring a vehicle surrounding, comprising: detecting a vehicle speed; detecting a driver's action; discriminating a good or bad visibility area around a vehicle surrounding on the basis of the vehicle speed and the driver's action when a vehicle travels across a poor visibility area upon detection of the vehicle speed decreasing below a given value and upon detection of the driver's action being aligned with a given action; taking up image of the vehicle surrounding in a dead angle of a driver; providing a display of image of the vehicle surrounding taken up in said image taking up step; detecting a current vehicle position; storing a particular location of the poor visibility area detected in said current vehicle position detecting step when the vehicle travels across the poor visibility area; and controlling said image taking up step to be executed to take up image and said display providing step to be initiated to provide the display of image in response to the vehicle arriving at the stored particular location.

According to a twelfth aspect of the present invention, there is provided a method of warning a vehicle obstacle, comprising: detecting a vehicle speed; detecting a driver's action; discriminating a good or bad visibility area around a vehicle surrounding on the basis of the vehicle speed and the driver's action when a vehicle travels across a poor visibility area upon detection of the vehicle speed decreasing below a given value and upon detection of the driver's action being aligned with a given action; detecting an obstacle present around the vehicle surrounding; issuing a warning signal upon detection of said obstacle; and controlling said obstacle detecting step to be executed to detect said obstacle and said warning signal issuing step to be initiated to issue said warning signal when said vehicle travels across the poor visibility area.

Other aspect and advantages of the invention will become more apparent from the following description, taken in conjunction with the accompanying drawings, illustrating by way of example the principles of the invention.

DETAILED DESCRIPTION OF THE PREFERRED EMBODIMENTS

First Preferred Embodiment

Figure 1:
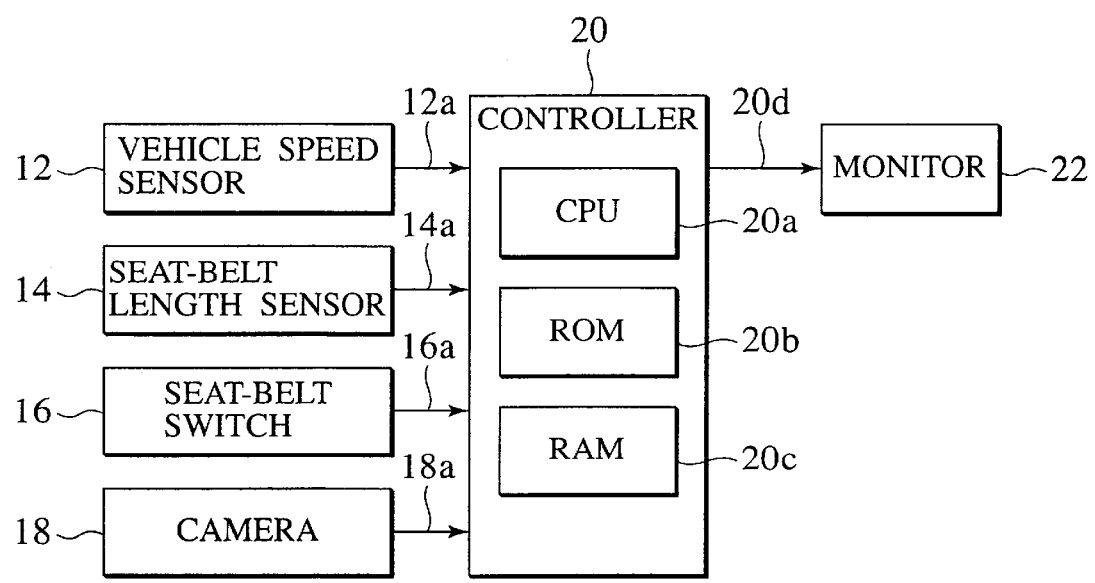
FIG. 1 is a block diagram of a vehicle surrounding circumstance discriminating system of a first preferred embodiment according to the present invention.

Referring FIG. 1, there is shown a vehicle surrounding circumstance discriminating system 10, which also forms a vehicle surrounding monitoring system and a vehicle obstacle warning system, of a first preferred embodiment according to the present invention to be mounted on a vehicle. The vehicle surrounding circumstance discriminating system 10 is comprised of a vehicle sensor 12, a seat belt length sensor 14, a seat belt switch 16, a camera 18 mounted at a front distal end of the vehicle, a controller 20 and a display monitor 22.

The vehicle speed sensor 12 measures a vehicle speed V to produce a vehicle speed signal 12a. The seat belt length sensor 14 detects a pull-out length L of a seat belt worn by a vehicle driver to produce a seat belt length signal 14a. The seat belt switch 16 detects the presence of or absence of the seat belt worn by the vehicle driver to produce a seat belt wearing signal 16a. The camera 18 takes an image representative of right and left poor visibility areas ahead of a vehicle in a dead angle of the vehicle driver to produce an image signal 18a.

The controller 20 is constructed of a CPU 20a, a ROM 20b and a RAM 20c to implement a control program for producing output image data 20d, representing the poor visibility areas around a vehicle surrounding taken up by the camera 18, to be delivered to the monitor 22 if desired.

Figure 2:
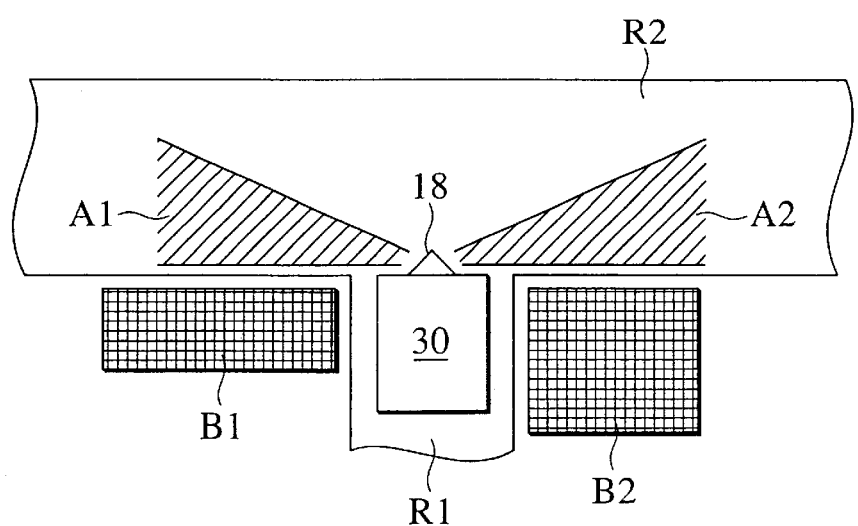
FIG. 2 is a schematic view illustrating poor visibility areas, ahead of a vehicle, of which images are taken up with a camera.

FIG. 2 shows a vehicle surrounding status where the vehicle 30 is traveling on a road R1 at both sides of which left and right buildings B1, B2 are located and where the vehicle 30 is just before entering a crossroads R2 at an area ahead of the buildings B1, B2. Thus, FIG. 2 shows image areas A1, A2 (i.e. left and right hazardous poor visibility areas) to be taken with the camera 18. In other words, it becomes impossible for the vehicle driver to directly recognize the poor visibility areas A1, A2, i.e. left and right vehicle surrounding circumstances in the dead angle of the vehicle driver owing to the left and right buildings B1, B2. In such a case, the vehicle surrounding circumstance discriminating system 10 of the present invention operates to compel the camera 18, which is mounted at the front distal end of the vehicle 30, to take picture images of the respective poor visibility areas A1, A2 on the road R2 in the dead angle of the vehicle driver, with image data being delivered to the monitor 22 for a display of these picture images to assist the driver's view.

However, the presence of image, displayed over the monitor 22, of the vehicle surrounding in the poor visibility areas in the dead angle of the vehicle driver is a strictly subsidized function for the vehicle driver and, so, the vehicle driver must perform a recognition with the eye by himself. To this end, the vehicle surrounding circumstance discriminating system 10 of the first preferred embodiment of the present invention is so arranged as to detect the vehicle driver's action for recognizing with the eye at an intersecting point in the poor visibility area and subsequently to compel the camera 18 to take image of the hazardous areas, i.e. the right and left poor visibility areas A1, A2 in the dead angle of the vehicle driver ahead of the vehicle, with the image being displayed over the monitor 22. With such an arrangement, the vehicle surrounding circumstance discriminating system 10 of the present invention enables the display of image of the hazardous areas only at a location effective for assisting the driver's eye recognition to preclude a collision with the obstacles in the poor visibility areas.

Figure 3:
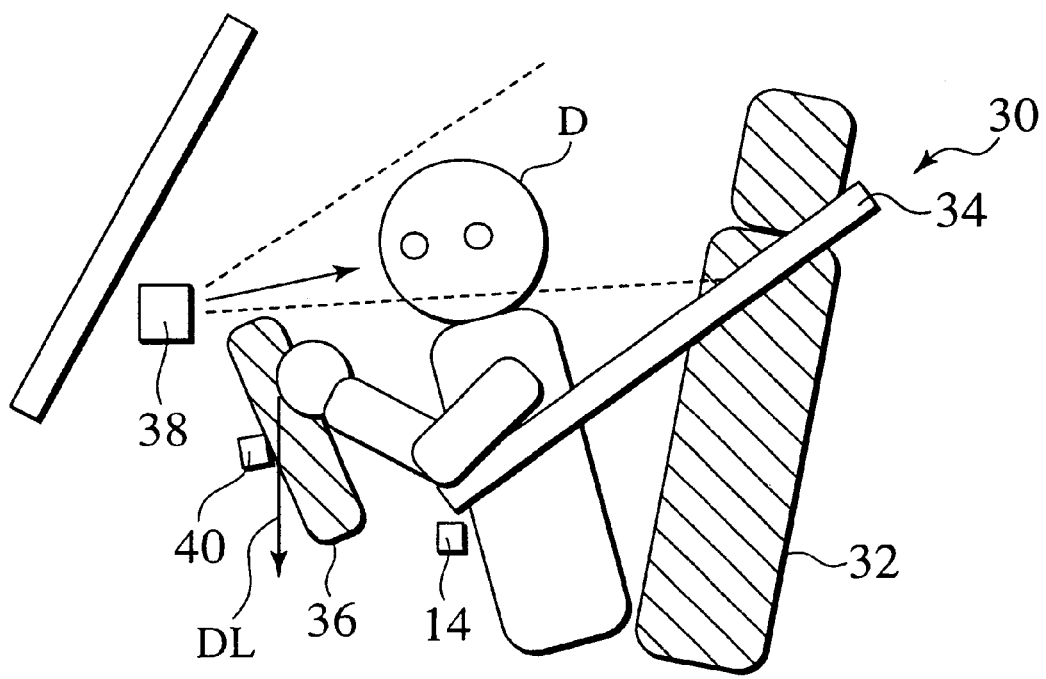
FIG. 3 is a schematic view illustrating various methods for detecting a driver's distinctive action to perform an eye recognition for a vehicle surrounding in the poor visibility areas.

FIG. 3 shows an example of various parameters which the vehicle surrounding circumstance discriminating system 10 of the present invention can employ for carrying out a process for detecting the driver's action for recognizing with the eye at an intersecting point in the hazardous, poor visibility areas. In FIG. 3, the vehicle is shown to have a vehicle seat 32 on which the vehicle driver D wears the seat belt 34, with his hand being placed on a steering handle 36 which may be mounted with a load sensor 40 for detecting a downward load DL exerted thereto by the vehicle driver D when the vehicle driver takes an action to perform the eye recognition for the vehicle surrounding in the poor visibility areas at the crossroads with his body thrust forward. A reference numeral 38 designates a camera which takes a picture of a driver's face to detect a change in a face area of the vehicle driver D when the vehicle 30 enters the hazardous area at the intersecting point in the dead angle of the vehicle driver D. The seat belt 34 is associated with the seat belt pull-out length sensor 14 (also see FIG. 1) and the seat belt switch 16 (see FIG. 1) for the purposes described below in detail. At the intersecting point in the hazardous, poor visibility areas, it is common to the vehicle driver D to take distinctive actions which involve: (1) the vehicle driver acts to slow down the vehicle and slowly enters the intersecting point, and (2) the vehicle driver compels himself with his body thrust forward ahead of his seating position in a normal drive mode to obtain an increased visibility around the vehicle surrounding in the hazardous areas. Methods for detecting such an action for eye recognition are carried out by detecting the vehicle speed while detecting the pull-out length L of the seat belt with the use of the seat belt length sensor 14, detecting the downward load DL exerted to the steering wheel 36 or detecting a change in face image of the vehicle driver. In the first preferred embodiment, the vehicle speed V is detected with the vehicle speed sensor V and the pull-out length L of the seat belt 34 is detected with the seat belt length sensor 14 to allow the vehicle surrounding circumstance discriminating system 10 to discriminate that the vehicle driver is taking the distinctive action for the eye recognition at the intersecting point in the hazardous, poor visibility areas under a condition wherein the vehicle speed is slower than a given vehicle speed and the seat belt length L exceeds a given value.

Figure 4:
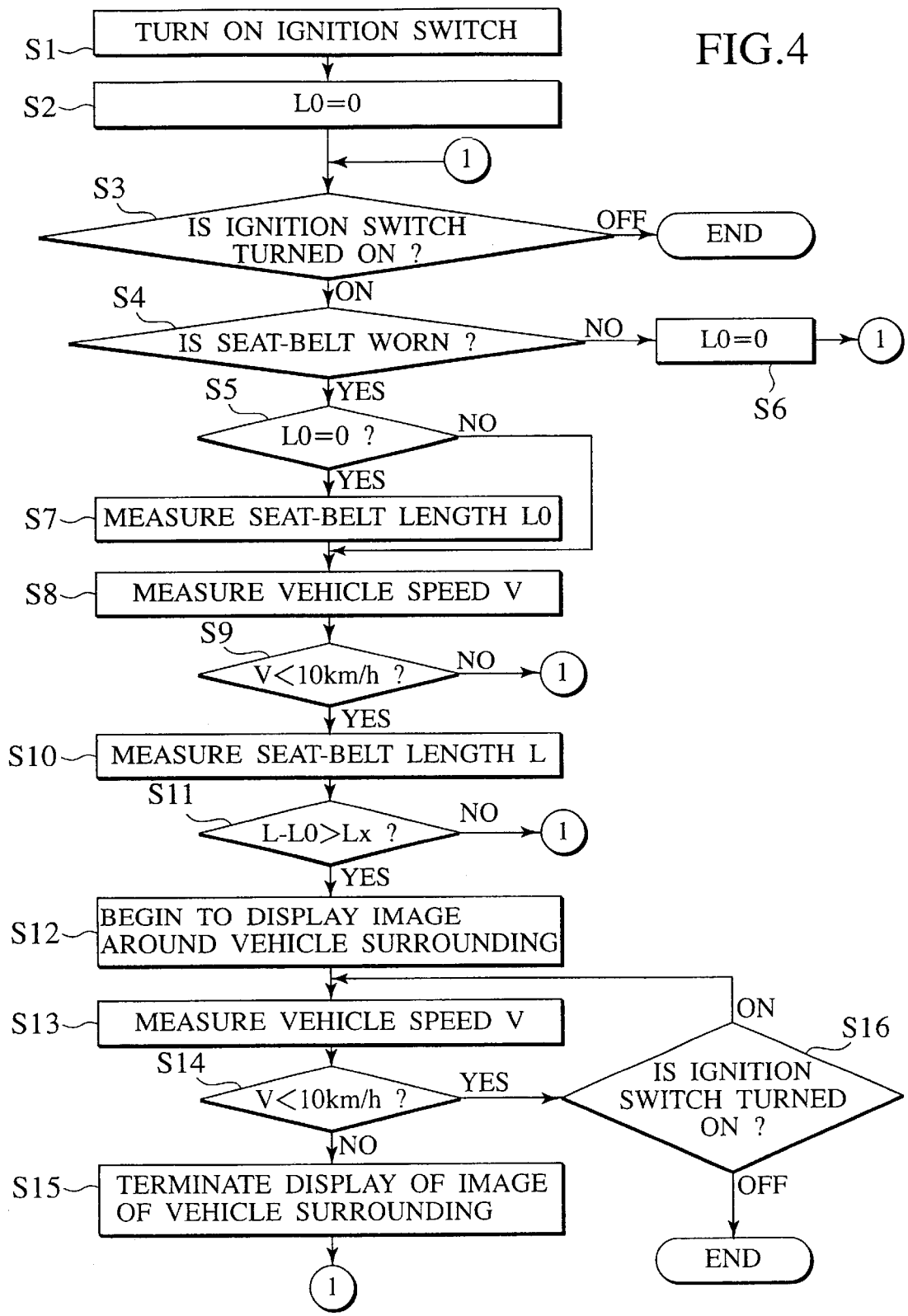
FIG. 4 is a flow chart illustrating the basic sequence of operations of the vehicle surrounding circumstance discriminating system of the first preferred embodiment to carry out a display control program for image of the vehicle surrounding.

FIG. 4 is a flow chart illustrating the basic sequence of operations of the vehicle surrounding circumstance discriminating system to carry out a method of the present invention for implementing a display control program to provide the display of image of the vehicle surrounding in the poor visibility areas.

In step S1, an ignition switch (not shown) is turned on and the controller 20 begins to implement the display control program.

In step S2, the controller 20 functions to reset a reference length $L_0$ of the seat belt to "0" level corresponding to a situation wherein the vehicle driver wears the seat belt and takes a normal drive mode. Then, the reference length Lo of the seat belt is stored in the RAM 20c of the controller 20.

In step S3, the controller 20 discriminates whether the ignition switch is turned on or turned off. If the ignition switch is turned off, the controller 20 terminates the above display control. In contrast, if the ignition switch remains turned on, then the operation goes to step S4.

In step S4, the seat belt switch 16 (see FIG. 1) detects the presence of or the absence of the seat belt being worn by the vehicle driver. If, in this instance, the vehicle driver does not wear the seat belt, then, the operation goes to step S6 where the controller 20 resets the seat-belt reference length $L_0$ to "0" level and the operation returns to step S3.

On the contrary, if the vehicle driver wears the seat belt, then, the operation goes to step S5 where the controller 20 discriminates whether the seat-belt reference length bears the "0" level. When the seat-belt reference length remains at the "0" level, the operation goes to step S7 where the pull-out length of the seat belt is measured with the seat belt length sensor 14 (see FIG. 1) to produce the reference length $L_0$ which is stored. If the seat-belt reference length $L_0$ is out of "0" level, the controller 20 discriminates that the measurement of the seat-belt reference length $L_0$, appearing when the vehicle driver takes the normal drive mode, has been completed, thereby skipping to step S7.

In step S8, the vehicle speed sensor 12 measures the vehicle speed V. In consecutive step S9, the controller 20 discriminates whether the vehicle speed V remains at a lower value than a discriminating reference value $V_0$, which is determined as a reference value for enabling a discrimination whether, when the vehicle enters the intersecting point in the poor visibility areas, the vehicle is traveling at a slow speed sufficient for the vehicle driver to recognize with the eye the vehicle surrounding in the hazardous areas. In the first preferred embodiment, the discriminating reference value $V_0$ is selected to have a value, of for example, 10 Km/h. When the vehicle speed V exceeds the value of 10 Km/h, the operation returns to step S3 for the repeated cycle of operations in the above steps.

When the vehicle speed V is slower than the value of 10 Km/h, the operation goes to step S10 where the pull-out length L of the seat belt is measured with the seat belt length sensor 14. In step S11, the controller 20 implements a comparison between the measured pull-out length L of the seat belt and the reference length $L_0$ in the normal drive mode to discriminate whether a difference $(L-L_0)$ is greater than the discriminating reference value $L_x$. The discriminating reference value $L_x$ serves as a reference value, which is exemplarily and suitably selected to have a value of 15 cm, to enable detection of the driver's behavior, for discriminating whether the driver compels his body thrust forward from his normal driving attitude at the crossroads in the hazardous areas, using the change in the pull-out length of the seat belt. When the difference $(L-L_0)$ is less than 15 cm, the operation goes to step S3 for the above repeated cycle of operations. When the difference $(L-L_0)$ is greater than 15 cm, the operation goes to step S12.

Under a condition where the vehicle speed V is lower than the discriminating reference value $V_0$ and where the difference between the pull-out length L of the seat belt and the seat-belt reference length $L_0$ in the normal drive mode is greater than the value of 15 cm, the controller discriminates that the vehicle driver has undertaken the distinctive action to implement the eye recognition for the vehicle surrounding in the poor visibility areas at the crossroads in the hazardous areas, allowing picture image of the right and left hazardous areas, ahead of the vehicle taken with the camera 18 in step S12, to be displayed over the monitor 22.

In step S13, the vehicle speed V is measured. In consecutive step S14, the controller 20 discriminates whether the vehicle speed V is lower than the discriminating reference value $V_0$ (=10 Km/h). In case of the vehicle speed lower than the value of 10 Km/h, the controller 20 discriminates that the vehicle driver still continues to take the action for implementing the eye recognition for the vehicle surrounding in the poor visibility areas. When this occurs, the operation goes to step S16 where an operating state of the ignition switch is confirmed. When the ignition switch remains turned on, the operation returns to step S13 while successively permitting the monitor 22 to provide the display of picture image of the vehicle surrounding in the poor visibility areas ahead of the vehicle. In contrast, if the ignition switch is turned off, the controller 20 terminates its whole operations.

On the other hand, when the vehicle speed V exceeds the value of 10 Km/h, the controller 20 discriminates that the vehicle has entered the hazardous area at the crossroads and the vehicle driver has terminated his eye recognition for the vehicle surrounding. When this occurs, the operation goes to step S15, terminating the display over the monitor 22 for picture image of the vehicle surrounding in the hazardous areas. Thereafter, the operation returns to step S3 for repeated operations of the aforementioned steps.

With such a structure described above, the vehicle surrounding circumstance discriminating system of the present invention is so arranged to measure the vehicle speed and the pull-out length L of the seat belt to allow the measured outputs to be used for discriminating whether the vehicle driver had undertaken the distinctive action to to execute the eye recognition for the vehicle surrounding circumstances in the poor visibility areas at the intersecting point. This action is discriminated when the vehicle speed V is lower than the given reference value $V_0$ (=10 Km/h) and the difference between the pull-out length L of the seat belt and the reference length $L_0$ is greater than the given value $L_x$ (=15 cm), compelling the monitor 22 to provide the display of image of the vehicle surrounding circumstances, in the poor visibility in the dead angle of the vehicle driver, taken up by the camera 18 (see FIG. 2). Thus, it is possible for image of the vehicle surrounding to be displayed only at the location in the poor visibility areas in the dead angle of the vehicle driver, allowing useless image taking up steps and image displaying steps to be eliminated.

In the first preferred embodiment discussed above, further, although an exemplary description has been made in conjunction with the method for discriminating whether the vehicle driver had undertaken the distinctive action for implementing the eye recognition for the vehicle surrounding in the poor visibility areas on the basis of the vehicle speed and the pull-out length of the seat belt, a modification may be made to those skilled in the art such that instead of detecting the pull-out length of the seat belt, the downward load sensor 40 may be located as seen in FIG. 3 to detect the downward load DL for discriminating whether the vehicle driver changes his attitude with his body thrust forward, for performing the eye recognition, to apply the downward force DL to the steering wheel 36 with a value greater than a given reference value. A further modification may be made such that discrimination for the driver's action to perform the aforementioned eye recognition on the basis of the vehicle speed, the pull-out length of the seat belt and the downward load DL exerted to the steering wheel 36 from the vehicle driver.

Also, it is to be noted that the vehicle surrounding circumstance discriminating system of the present invention may further include an audible or vibrating alarm for processing the detection signals to issue a warning signal representative of the obstacles appearing in the hazardous areas in the dead angle of the vehicle driver.

Second Preferred Embodiment

Figure 5:
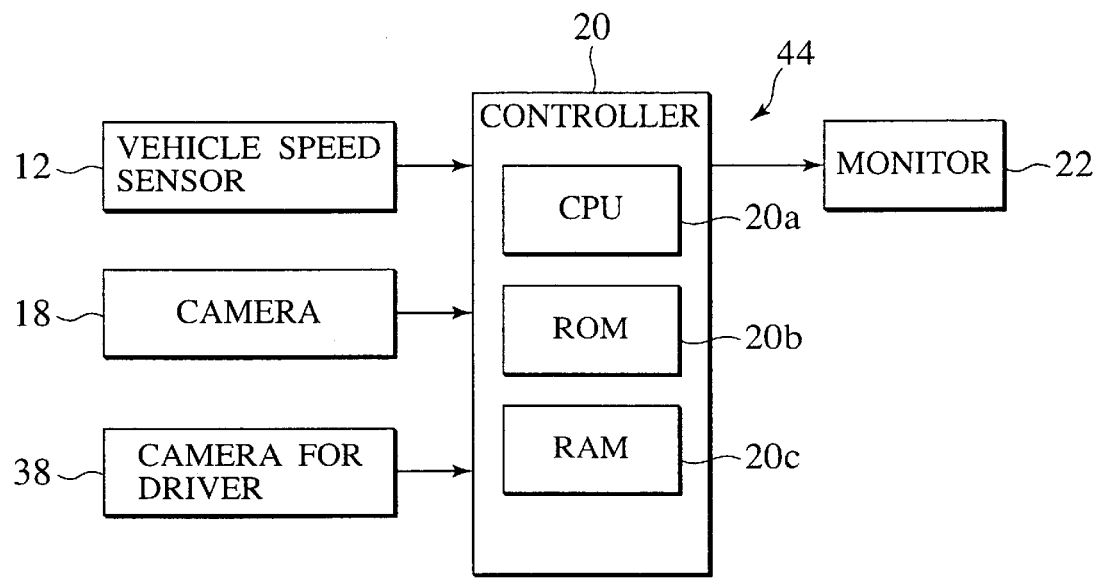
FIG. 5 is a block diagram of a vehicle surrounding circumstance discriminating system of a second preferred embodiment according to the present invention.
Figure 6:
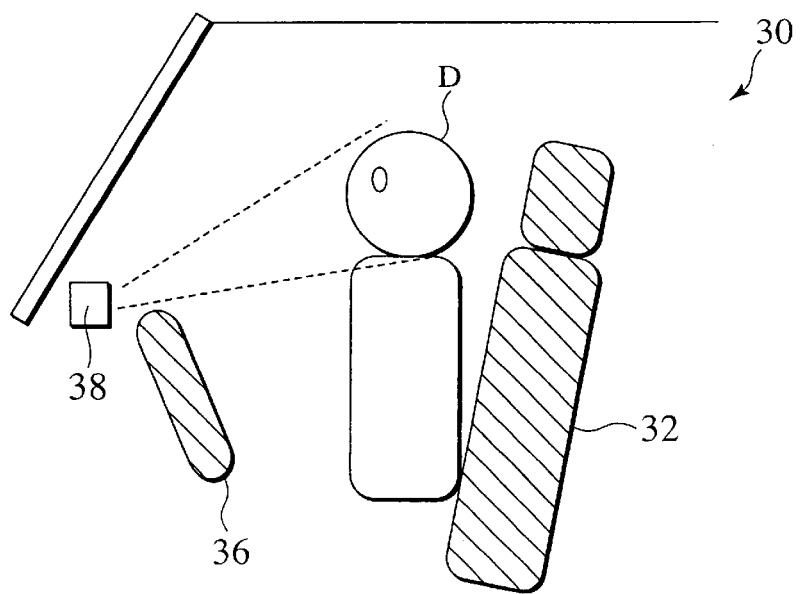
FIG. 6 is a schematic view illustrating the relationship between a vehicle driver and a mount position of a camera adapted to take up picture image of the vehicle drive.

FIG. 5 shows a vehicle surrounding circumstance discriminating system, of a second preferred embodiment according to the present invention, which is arranged to respond to the vehicle speed and the change in the driver's face for detecting the driver's action for performing the eye recognition of the vehicle surrounding circumstances in the poor visibility at the hazardous areas, with like parts bearing the same reference numerals as those used in FIG. 1 to omit the redundant description of the same component parts.

In the second preferred embodiment, the vehicle surrounding circumstance discriminating system, generally designated at 44, includes the camera 38 which is installed on an instrument panel (not shown) in the vehicle 30 for taking up image of the driver's face at a front portion thereof.

Figure 7:
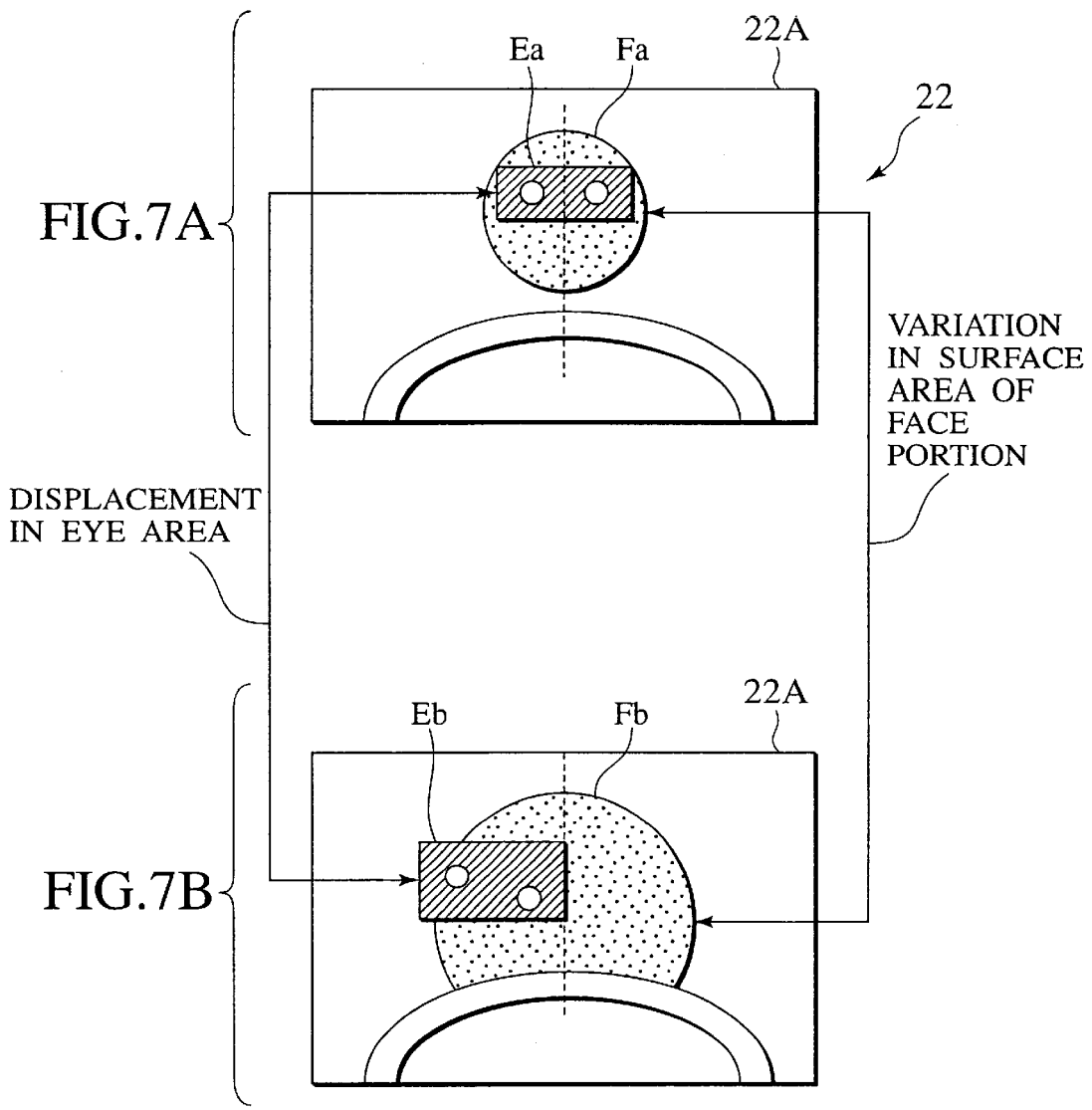
FIGS. 7A and 7B show differences in face portion, taken up with the camera, of the vehicle driver appearing on a screen.

FIGS. 7A and 7B show images taken up with the driver's camera 38, respectively, and FIG. 7A shows image of the driver's face in the normal drive mode whereas FIG. 7B shows image of the driver's face appearing when the driver takes the action for performing the eye recognition for the vehicle surrounding circumstances in the poor visibility areas. When the vehicle driver remains in the normal drive mode, the driver's face surface area Fa appearing on a display screen 22A of the monitor 22 is substantially fixed as viewed in FIG. 7A with a distinctive area composed of a eye image area Ea remaining at a substantially fixed central position.

However, in an event that the vehicle enters the crossroads in the poor visibility areas, the vehicle driver tends to compel his body thrust forward from his normal driving attitude with a view to performing the eye recognition for the vehicle surrounding in the hazardous areas. When this occurs, the driver's face becomes closer to the driver's camera 38 such that the driver's face surface area Fa appearing on the screen 22A is increased to have a larger surface area than that attained in the normal drive mode, with the position of the eye image area Ea being shifted to another position indicated at Eb in FIG. 7B from the original position shown in FIG. 7A in the normal drive mode. As a consequence, upon detection of the change in the surface area of the driver's face occupied in the screen 22A and the change in the position of the eye image area, it is possible for the vehicle surrounding circumstance discriminating system 44 to detect the driver's distinctive action specific for the eye recognition for the hazardous areas.

Figure 8:
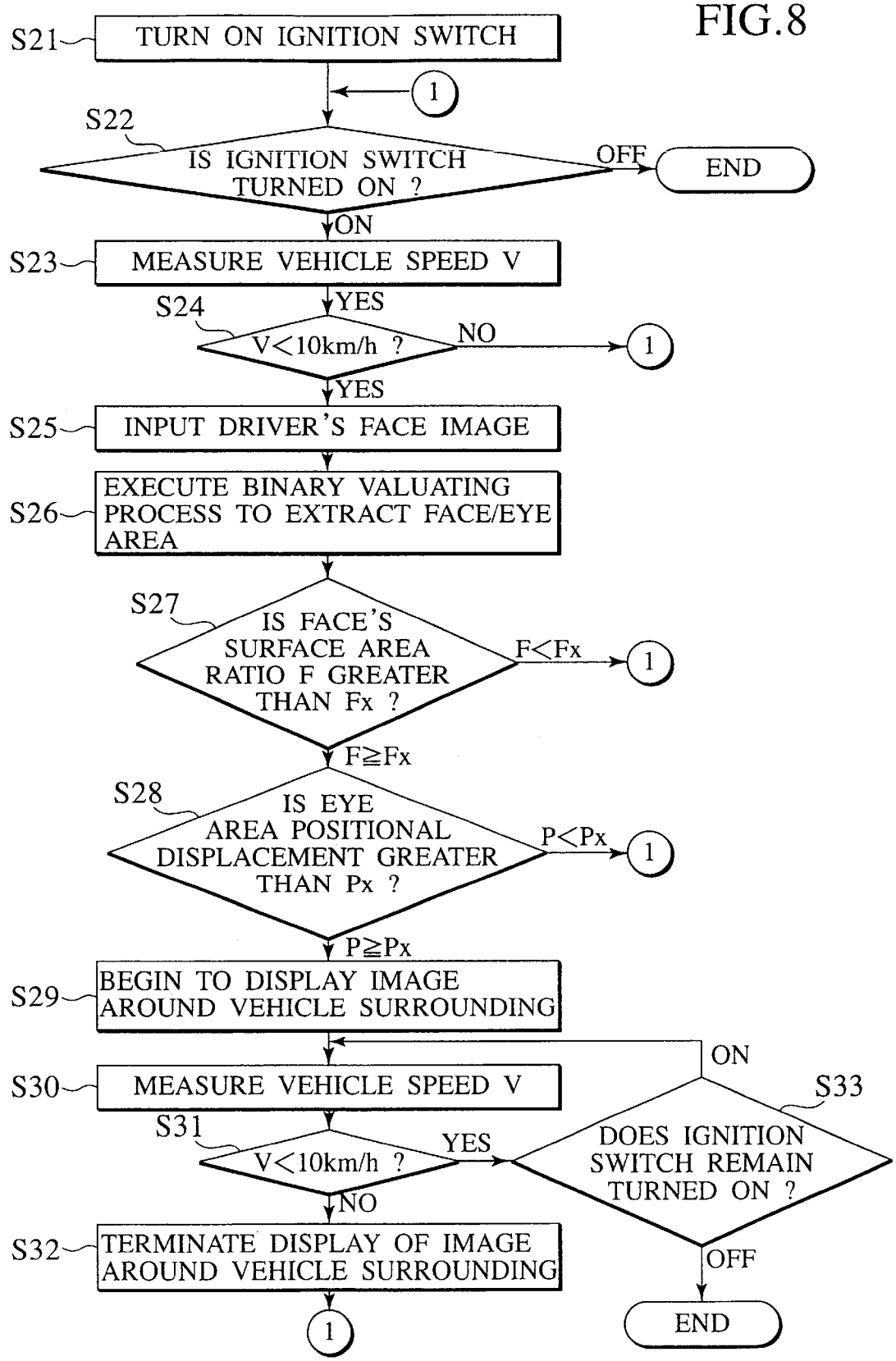
FIG. 8 is a flow chart illustrating the basic sequence of operations of the vehicle surrounding circumstance discriminating system of the second preferred embodiment to carry out a display control program for image of the vehicle surrounding.

FIG. 8 is a flow chart illustrating the basic sequence of operation of the vehicle surrounding circumstance discriminating system of the second preferred embodiment for carrying out a related method to execute a display control program for image of the vehicle surrounding in the poor visibility areas.

In step S21, an ignition switch (not shown) is turned on and the controller 20 begins to execute the display control program.

In step S22, the controller 20 discriminates whether the ignition switch is turned on or turned off. If the ignition switch is turned off, the controller 20 terminates the above display control. In contrast, if the ignition switch remains turned on, then the operation goes to step S23.

In step S23, the vehicle speed sensor 12 measures the vehicle speed V. In consecutive step S24, the controller 20 discriminates whether the vehicle speed V remains at a lower value than the aforementioned discriminating reference value $V_0$ ((=10 Km/h).

When the vehicle speed V exceeds the value of 10 Km/h, the operation returns to step S22. If the vehicle speed V is lower than the value $V_0$, the operation goes to step S25.

When the vehicle speed V is lower than the discriminating reference value $V_0$, then the camera 30d is operated to take image of the driver's face to deliver a face image output to the controller 20 in step S25. In a consecutive step S26, a binary evaluation is executed with respect to the driver's face image to extract face and eye areas.

In step S27, the controller 20 execute a computation to obtain the surface area ratio F of the driver's face occupied on the monitor screen 22A and compares the surface area ratio F with the discriminating reference value $F_x$. As shown in FIG. 7A, the discriminating reference value $F_x$ is preferably selected to have a value, i.e. about 50%, slightly larger than the surface area ratio of the driver's face Fa occupied in the monitor display 22A when the vehicle driver remains in the normal drive attitude. When the surface area ratio F of the driver's face in a current drive mode is smaller than the discriminating reference value $F_x$, the controller 20 discriminates that the vehicle driver remains in the normal drive attitude. When this occurs, the operation returns to step S22 to repeatedly execute the aforementioned steps. In contrast, when the surface area ratio F of the driver's face in the current drive attitude exceeds the discriminating reference value $F_x$, the operation goes to step S28.

In step S28, the controller 20 calculates the position of the eye image area Ea from face image of the vehicle driver to detect a varied displacement P of a current position of the eye image area Ea relative to the original eye image area in the normal drive mode. Then, this displacement P is compared with the discriminating reference value $P_x$. The discriminating reference value $P_x$ represents the displacement of the driver's eye area transversely shifted from the center line, shown by a dotted line in FIGS. 7A and 7B, of the monitor screen 22A, and is preferably selected to have a value of about 20% with respect to a reference composed of a distance between the center line and an edge of the monitor display 22A. When the displacement P of the driver's current eye area is smaller than the discriminating reference value $P_x$, the controller 20 discriminates that the vehicle driver remains in the normal drive mode. When this occurs, the operation returns to step S22 for repeated execution of the aforementioned steps. On the contrary, when the displacement of the current eye image area exceeds the discriminating reference value $P_x$, the operation goes to step S29.

Under a condition where the vehicle speed V is lower than the discriminating reference value $V_0$ (=10 Km/h) and where the surface area ratio F of driver's face image is larger than the discriminating reference value $F_x$ and the displacement P of the driver's eye area exceeds the discriminating reference value $P_x$, the controller discriminates that the vehicle drivers takes an action to implement the eye recognition for the vehicle surrounding in the poor visibility areas, allowing picture image of the right and left hazardous areas, ahead of the vehicle taken with the camera 18 in step 29, to be displayed over the monitor 22.

In step S31, the vehicle speed V is measured. In consecutive step S32, the controller 20 discriminates whether the vehicle speed V is lower than the discriminating reference value $V_0$ (=10 Km/h). In case of the vehicle speed lower than the value of 10 Km/h, the controller 20 discriminates that the vehicle driver still continues to take the action for implementing the eye recognition for the vehicle surrounding in the poor visibility areas. When this occurs, the operation goes to step S33 where an operating state of the ignition switch is confirmed. When the ignition switch remains turned on, the operation returns to step S30 while successively permitting the monitor 22 to provide the display of picture image of the vehicle surrounding in the poor visibility areas ahead of the vehicle. In contrast, if the ignition switch is turned off, the controller 20 terminates its whole operations.

On the other hand, when the vehicle speed V exceeds the value of 10 Km/h, the controller 20 discriminates that the vehicle has entered the hazardous area at the crossroads and the vehicle driver has terminated his eye recognition for the vehicle surrounding. When this occurs, the operation goes to step S32, terminating the display over the monitor 22 for picture image of the vehicle surrounding in the hazardous areas. Thereafter, the operation returns to step S22 for repeated operations of the aforementioned steps.

As is apparent from the foregoing description, the vehicle surrounding circumstance discriminating system of the second preferred embodiment is so arranged to measure the vehicle speed while detecting the surface area ratio F of the eye image area occupied on the monitor screen and the displacement P of the eye image area in the monitor screen to allow the detected outputs to be used for discriminating whether the vehicle driver had undertaken the distinctive action to recognize with the eye for the vehicle surrounding circumstances in the poor visibility areas at the intersecting point. This action is discriminated when the vehicle speed V is lower than the given reference value $V_0$ (=10 Km/h) while the surface area ratio F of the driver's face image exceeds the discriminating reference value $F_x$ and the displacement P of the driver7s eye area exceeds the discriminating reference value $P_x$, compelling the monitor 22 to provide the display of image of the vehicle surrounding circumstances, in the poor visibility in the dead angle of the vehicle driver, taken by the camera 18. Thus, it is possible for image of the vehicle surrounding to be displayed only at the location in the poor visibility areas in the dead angle of the vehicle driver, allowing useless image taking steps and image displaying steps to be eliminated.

Third Preferred Embodiment

Figure 9:
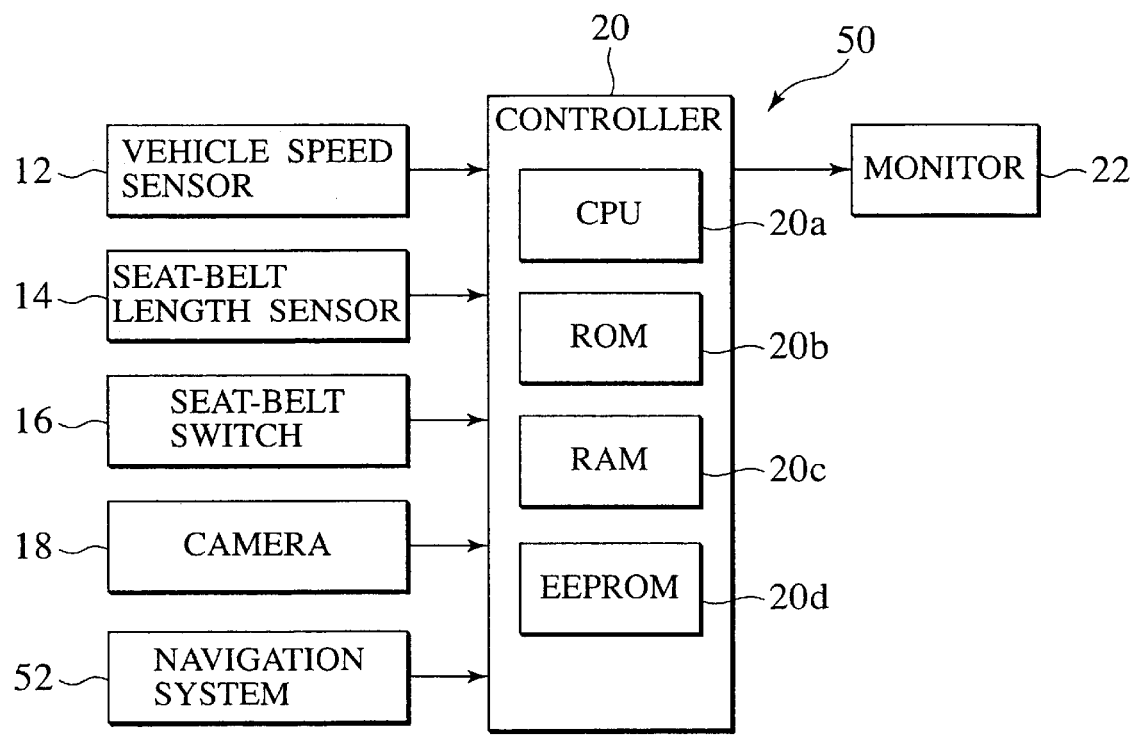
FIG. 9 is a block diagram of a vehicle surrounding circumstance discriminating system of a third preferred embodiment according to the present invention.

FIG. 9 shows a vehicle surrounding circumstance discriminating system, of a third preferred embodiment according to the present invention, which is arranged to store a road point at which the vehicle driver has taken the action for eye recognition of the vehicle surrounding in the poor visibility areas and to respond to the road point stored in the memory for beginning to display image of the vehicle surrounding in an automatic manner subsequently when the vehicle travels across the stored road point, with like parts bearing the same reference numerals as those used in FIG. 1 to omit the redundant description of the same component parts.

In the third preferred embodiment, the vehicle surrounding circumstance discriminating system, generally designated at 50, further includes a navigation system 52 for detecting current position information of the vehicle. Current position information involves longitude and latitude of a node at an intersecting point, and, in addition to these factors, information representative of any road link or any orientation of a traveling route which the vehicle has passed. Also, the controller 20 further includes an EEPROM 20d which stores a display start position correlated with a current position of the vehicle which enters a particular road point in the poor visibility areas.

Figure 10:
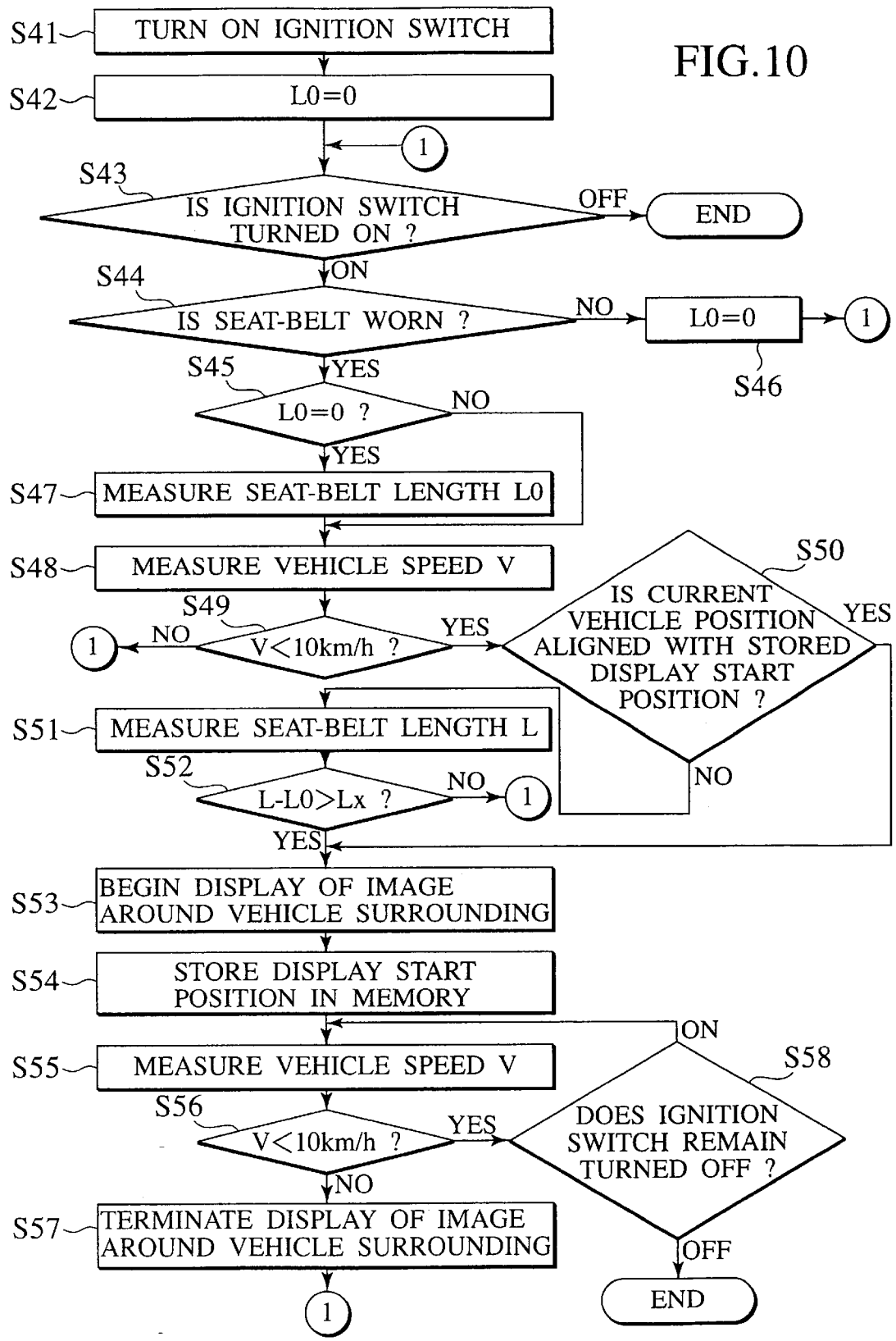
FIG. 10 is a flow chart illustrating the basic sequence of operations of the vehicle surrounding circumstance discriminating system of the third preferred embodiment to carry out a display control program for image of the vehicle surrounding.

FIG. 10 is a flow chart illustrating the basic sequence of operation of the vehicle surrounding circumstance discriminating system 50 of the third preferred embodiment to execute a display control program for image of the vehicle surrounding in the poor visibility areas.

In step S41, an ignition switch (not shown) is turned on and the controller 20 begins to execute the display control program.

In step S42, the controller 20 functions to reset a reference length $L_0$ of the seat belt to "0" level corresponding to a situation wherein the vehicle driver wears the seat belt and takes a normal drive attitude. Then, the reference length $L_0$ of the seat belt is stored in the RAM 20c of the controller 20.

In step S43, the controller 20 discriminates whether the ignition switch is turned on or turned off. If the ignition switch is turned off, the controller 20 terminates the above display control. In contrast, if the ignition switch remains turned on, then the operation goes to step S44.

In step S44, the seat belt switch 16 detects the presence of or the absence of the seat belt being worn by the vehicle driver. If, in this instance, the vehicle driver does not wear the seat belt, then, the operation goes to step S46 where the controller 20 resets the seat-belt reference length $L_0$ to "0" level and the operation returns to step S43.

On the contrary, if the vehicle driver wears the seat belt, then, the operation goes to step S45 where the controller 20 discriminates whether the seat-belt reference length bears the "0" level. When the seat-belt reference length remains at the "0" level, the operation goes to step S47 where the pull-out length of the seat belt is measured with the seat belt length sensor 14 to produce the reference length $L_0$ which is stored. If the seat-belt reference length $L_0$ is out of "0" level, the controller 20 discriminates that the measurement of the seat-belt reference length $L_0$, appearing when the vehicle driver takes his normal drive attitude, has been completed, thereby skipping to step S47.

In step S48, the vehicle speed sensor 12 measures the vehicle speed V. In consecutive step S49, the controller 20 discriminates whether the vehicle speed V remains at a lower value than a discriminating reference value $V_0$ (=10 Km/h). When the vehicle speed V exceeds the value of 10 Km/h, the operation returns to step S43 for repeated operations of the aforementioned steps.

On the other hand, when the vehicle speed V is slower than the value of 10 Km/h, the operation goes to step S50.

In step S50, the navigation system 52 recognizes a current position of the vehicle to deliver current position information to the controller 20. The controller 20 compares current position information with a display start position stored in the EEPROM 20d to discriminate whether the vehicle enters the particular area indicative of the display start position. The display start position refers to a road point at which the vehicle driver has taken the distinctive action to execute the eye recognition for the poor visibility areas in the past to cause the monitor 22 to provide the display of the hazardous areas around the vehicle surrounding, with the road point being stored in the EEPROM 20d. When it is discriminated that the current vehicle position is aligned with the display start position, the operation goes to step S53, compelling the monitor 22 to provide the display of image, of the right and left hazardous areas ahead of the vehicle in the poor visibility areas in the dead angle of the vehicle driver, taken by the camera 18.

In contrast, when the current vehicle position is dislocated from the aforementioned display start position, the operation goes to step S51 where the pull-out length L of the seat belt is measured with the seat belt length sensor 14.

In consecutive step S52, the controller 20 implements a comparison between the measured pull-out length L of the seat belt and the reference length $L_0$ in the normal drive mode to discriminate whether a difference (L–$L_0$) is greater than the discriminating reference value $L_x$ (=15 cm). When the difference (L–$L_0$) is less than 15 cm, the operation returns to step S43 for the above repeated cycle of operations. When the difference (L–$L_0$) is greater than 15 cm, the operation goes to step S53.

Under a condition where the vehicle speed V is lower than the discriminating reference value $V_0$ and where the difference between the pull-out length L of the seat belt and the seat-belt reference length $L_0$ in the normal drive mode is greater than the value of 15 cm, the controller 20 discriminates that the vehicle driver has taken the action to implement the eye recognition for the vehicle surrounding in the poor visibility areas at the crossroads in the hazardous areas, allowing picture image of the right and left hazardous areas, ahead of the vehicle taken with the camera 18 in step 53, to be displayed over the monitor 22.

In next step S54, the controller 22 discriminates that the vehicle driver has taken the distinctive action to execute the eye recognition for the vehicle surrounding, compelling the navigation system 52 to detect the road point as the display start position, at which the monitor 22 has begun to provide the display of picture image of the vehicle surrounding ahead of the vehicle, for thereby producing road point information. The road point information is then stored in the EEPROM 20d.

In step S55, the vehicle speed V is measured. In consecutive step S56, the controller 20 discriminates whether the vehicle speed V is lower than the discriminating reference value $V_0$ (=10 Km/h). In case of the vehicle speed lower than the value of 10 Km/h, the controller 20 discriminates that the vehicle driver still continues to take the action for implementing the eye recognition for the vehicle surrounding in the poor visibility areas. When this occurs, the operation goes to step S58 where an operating state of the ignition switch is confirmed. When the ignition switch remains turned on, the operation returns to step S55 while successively permitting the monitor 22 to provide the display of picture image of the vehicle surrounding in the poor visibility areas ahead of the vehicle. In contrast, if the ignition switch is turned off, the controller 20 terminates its whole operations.

On the other hand, when the vehicle speed V exceeds the value of 10 Km/h, the controller 20 discriminates that the vehicle has entered the hazardous area at the crossroads and the vehicle driver has terminated his eye recognition for the vehicle surrounding. When this occurs, the operation goes to step S57, terminating the display over the monitor 22 for picture image of the vehicle surrounding in the hazardous areas. Thereafter, the operation returns to step S43 for repeated operations of the aforementioned steps.

With such a structure described above, the vehicle surrounding circumstance discriminating system of the present invention is so arranged to measure the vehicle speed and the pull-out length L of the seat belt to allow the measured outputs to be used for discriminating whether the vehicle driver has taken the distinctive action to execute the eye recognition for the vehicle surrounding circumstances in the poor visibility areas at the intersecting point. This action is discriminated when the vehicle speed V is lower than the given reference value $V_0$ (=10 Km/h) and the difference between the pull-out length L of the seat belt and the reference length $L_0$ is greater than the given value $L_x$, (=15 cm), compelling the monitor 22 to provide the display of image of the vehicle surrounding circumstances, in the poor visibility in the dead angle of the vehicle driver, taken by the camera 18, whereas the road point correlated with the display start position is stored in the EEPROM 20d of the controller 20 to provide a capability for automatically providing the display of the vehicle surrounding when the vehicle subsequently travels across the road point. Thus, it is possible for image of the vehicle surrounding to be displayed only at the location in the poor visibility areas in the dead angle of the vehicle driver, allowing useless image taking steps and image displaying steps to be eliminated while causing the monitor to provide the display of the vehicle surrounding in a reliable manner while enabling an action discrimination of the vehicle driver to be omitted in operation in a case where the vehicle subsequently travels across the particular road point.

Modified Form Of Third Preferred Embodiment

In the third preferred embodiment, the vehicle surrounding circumstance discriminating system has been shown and described in conjunction with an example wherein, when the controller discriminates that the vehicle driver has undertaken the distinctive action to execute the eye recognition for the vehicle surrounding in the poor visibility areas, the controller instantaneously allows the image of the vehicle surrounding in the hazardous areas to be displayed over the monitor while storing the particular road point in the memory. However, in an event that the vehicle driver has executed the eye recognition for the vehicle surrounding in the poor visibility areas at a particular road point with his body thrust forward from the normal drive attitude, the presence of the eye recognition is reflected in a low degree of need for compelling image of the vehicle surrounding in the poor visibility areas to be displayed over the monitor. As a consequence, the particular road point may be merely stored in the memory and may be utilized for automatically initiating the display of image of the vehicle surrounding when the vehicle has subsequently come across the particular road point stored in the memory.

Figure 11:
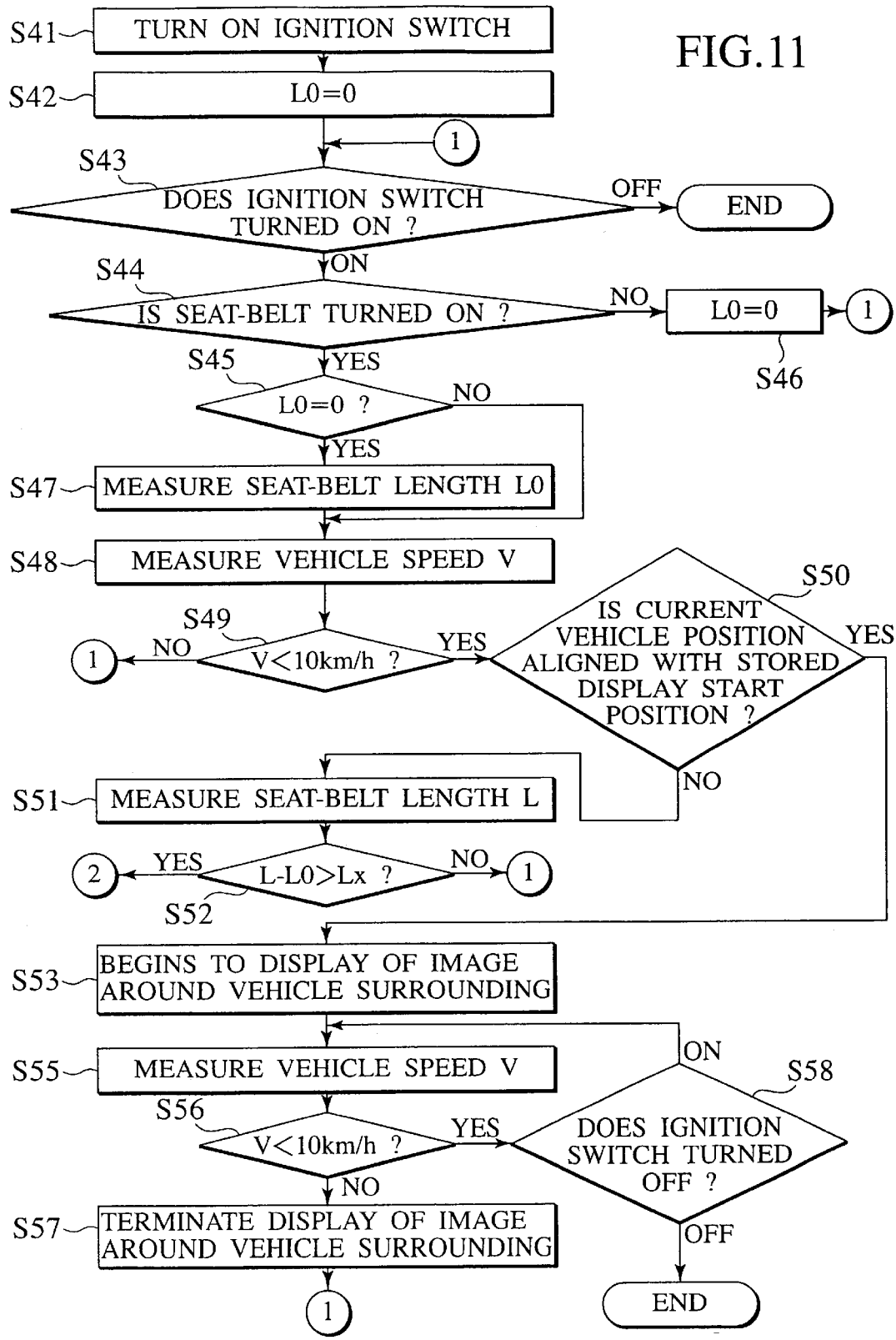
FIG. 11 is a flow chart illustrating the basic sequence of operations of the vehicle surrounding circumstance discriminating system of a modified form of the third preferred embodiment to carry out a display control program for image of the vehicle surrounding.

FIGS. 11 ad 12 are flow charts illustrating the basic sequences of operations of the vehicle surrounding circumstance discriminating system of the modified form for displaying image of the vehicle surrounding in the poor visibility areas on the monitor, with the same steps bearing the same reference numerals as those used in FIG. 10 for describing steps which are different from those steps of FIG. 10.

Figure 12:
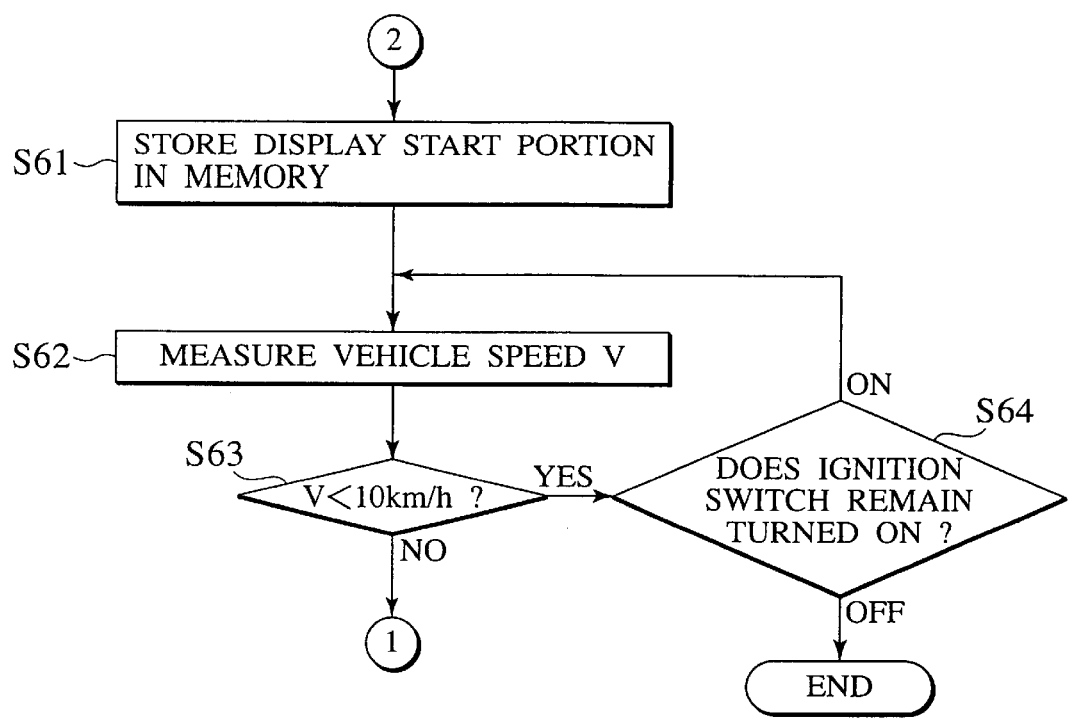
FIG. 12 is a flow chart illustrating the basic sequence of operations, subsequent to the flow chart of FIG. 11, of the vehicle surrounding circumstance discriminating system of the modified form of the third preferred embodiment.

When the vehicle sped V is lower than the discriminating reference value $V_0$ and the difference between the pull-out length L of the seat belt and the seat-belt reference length $L_0$ correlated with the normal drive attitude of the vehicle driver is greater than the value of 15 cm, the controller discriminates that the driver has undertaken the distinctive action to perform the eye recognition for the vehicle surrounding in the poor visibility areas at the crossroads in the hazardous areas. When this occurs, the operation goes from step S52 to step S61 shown in FIG. 12.

In step S61, the navigation system 52 detects the particular road point, information of which is stored in the EEPROM 20d as the display start position to be read out during a subsequent vehicle traveling period. Then, in step S62, the vehicle speed V is measured and, in consecutive step S63, the vehicle speed V is compared with the discriminating reference value. $V_0$ (=10 Km/h). When the vehicle speed V is lower than the discriminating reference value $V_0$, the operation goes to step S64 where the operating state of the ignition switch is confirmed. When the ignition switch remains turned on, the operation returns to step S62. In contrast, if the ignition switch remains turned off, the whole operation steps of the system is terminated. Also, when the measured vehicle speed V exceeds the discriminating reference value $V_0$, the operation returns to step S43 shown in FIG. 11 for repeated executions of the aforementioned steps.

From the description given above, in step S50, the controller 20 discriminates whether the current vehicle position detected with the navigation system 52 is aligned with the display start position stored in the EEPROM 20a of the controller 20. When, in this instance, the current vehicle position is aligned with the display start position, the operation goes to step S53. When this occurs, the controller 20 compels the monitor 22 to automatically provide the display of image of the vehicle surrounding ahead of the vehicle in the poor visibility areas without implementing the discrimination for the eye recognition attitude of the vehicle driver.

Although the third preferred embodiment has been exemplarily described in conjunction with an example wherein the controller commands the camera to take picture image of the right and left hazardous areas ahead of the vehicle to compel picture image to be displayed over the monitor, it may be modified such that the vehicle is mounted at its rear part with a camera for taking picture image of rear or sidewise vehicle surrounding in the poor visibility areas and the controller is programmed to detect the driver's distinctive action for taking the eye recognition for such hazardous areas and, upon detection of the driver's distinctive eye recognition attitude, to cause the monitor to provide the display of picture image of the rear or sidewise vehicle surroundings.

While, in the preferred embodiments discussed above, the present invention has been described in conjunction with an example where the vehicle surrounding monitor system which includes the device for discriminating the vehicle surrounding circumstances, the vehicle surrounding circumstance discriminating device may be applied to various systems other than the vehicle surrounding monitor device. For example, the vehicle surrounding circumstance monitoring device may be applied to a vehicle obstacle detection system, for detecting a vehicle obstacle present around the vehicle surrounding, which employs a sonar or laser radar which are arranged to be operated, upon discrimination of the vehicle traveling through the poor visibility areas, for effectuating the detection of the obstacles with a detected result providing a warning. Thus, it is possible for the vehicle obstacle detection system to correctly discriminate the vehicle surrounding in the poor visibility areas to enable the obstacle detection and the proper warning to be effectuated only at the poor visibility areas, resulting in a capability for precluding the useless obstacle detection and warning steps from being avoided at visible areas.

Further, although the preferred embodiments have been described above in conjunction with an example wherein the controller discriminates the good or bad visibility areas at the intersecting point, the location which needs the discrimination for the good or bad visibility areas is not limited to the intersecting point and may involve other areas such as pedestrian crossings, crossings and car parks.

In the illustrated embodiments discussed above, the vehicle speed sensor 12 represents a vehicle speed detection unit, the seat belt length sensor 14, the controller 20 and the driver camera 30d form a driver's attitude detection unit, the controller 20 forms a vehicle surrounding circumstance discriminating unit and a control unit, the camera 4 form an image taking unit, the monitor 22 forms a display unit, and the navigation system 52 forms a current vehicle position detection unit.

The entire content of a Japanese Patent Application No. P2001-36829 with a filing date of Feb. 14, 2001 is herein incorporated by reference.

Although the invention has been described above by reference to the preferred embodiments, the invention is not limited to the embodiment described above and other variations or modifications will occur to those skilled in the art, in light of the teachings. The scope of the invention is defined with reference to the following claims.

What is claimed is:

1. A vehicle surrounding circumstance discriminating system for a vehicle comprising:
   a vehicle speed detection unit detecting a vehicle speed;
   an action detecting unit detecting a driver's action; and
   a surrounding circumstance discriminating unit discriminating a good or bad visibility area around a vehicle surrounding on the basis of the vehicle speed and the driver's action, wherein:
      said surrounding circumstance discriminating unit discriminates that a vehicle travels across a poor visibility area upon detection of the vehicle speed decreasing below a given value and detection of a driver's given action.

2. The vehicle surrounding circumstance discriminating system according to claim 1, wherein:
   said action detecting unit includes a length detecting unit detecting a pull-out length of a seat belt and discriminates that, when a difference between the pull-out length of the seat belt, which is detected with said length detecting unit, and a pull-out length of the seat belt in a normal drive mode exceeds a given value, the driver has undertaken said given action with his body thrust forward from the normal drive mode.

3. The vehicle surrounding circumstance discriminating system according to claim 1, wherein:
   said action detecting unit includes a load detecting unit detecting a downward load exerted to a steering wheel and discriminates that, when the downward load detected with said load detecting unit exceeds a given value, the driver has undertaken said given action with his body thrust forward from a normal drive mode.

4. The vehicle surrounding circumstance discriminating system according to claim 1, wherein:
   said action detecting unit includes a face image taking up unit taking up image of a face portion of the driver and a face extracting unit extracting output image of the face portion from image taken up with said face image taking up unit, said action detecting unit discriminating that, when a ratio of output image of the face portion occupied in an image screen exceeds a given value, the driver has undertaken said given action with his body thrust forward from a normal drive mode.

5. The vehicle surrounding circumstance discriminating system according to claim 1, wherein:

said action detecting unit includes a face image taking up unit taking up face image of a face portion of the driver and a face extracting unit extracting image of an eye area from said face image taken up with said face image taking up unit, said action detecting unit discriminating that, when image of the eye area is displaced in a value exceeding a given value, the driver has undertaken said given action with his body thrust forward from a normal drive mode.

6. A vehicle surrounding monitoring system for a vehicle, comprising:

a vehicle surrounding circumstance discriminating system including a vehicle speed detection unit detecting a vehicle speed, an action detecting unit detecting a driver's action, and a surrounding circumstance discriminating unit discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action;

an image taking up unit taking up image of the vehicle surrounding in a dead angle of a driver;

a display unit providing a display of image of the vehicle surrounding taken up with said image taking up unit; and a control unit operative to cause said display unit to provide the display of image taken up with said image taking up unit when said surrounding circumstance discriminating unit discriminates that the vehicle travels across the poor visibility area.

7. The vehicle surrounding monitoring system according to claim 6, wherein:

said action detecting unit includes a length detecting unit detecting a pull-out length of a seat belt and discriminates that, when a difference between the pull-out length of the seat belt, which is detected with said length detecting unit, and a pull-out length of the seat belt in a normal drive attitude exceeds a given value, the driver has undertaken said given action with his body thrust forward from a normal drive mode.

8. The vehicle surrounding monitoring system according to claim 6, wherein:

said action detecting unit includes a load detecting unit detecting a downward load exerted to a steering wheel and discriminates that, when the downward load detected with said load detecting unit exceeds a given value, the driver has undertaken said given action with his body thrust forward from a normal drive mode.

9. The vehicle surrounding monitoring system according to claim 6, wherein:

said action detecting unit includes a face image taking up unit taking up image of the face portion of the driver and a face extracting unit extracting output image of the face portion from image taken up with said face image taking up unit, said action detecting unit discriminating that, when a ratio of output image of the face portion occupied in an image screen exceeds a given value, the driver has undertaken said given action with his body thrust forward from a normal drive mode.

10. The vehicle surrounding monitoring system according to claim 6, wherein:

said action detecting unit includes a face image taking up unit taking up face image of a face portion of the driver and a face extracting unit extracting image of an eye area from said face image taken up with said face image taking up unit, said action detecting unit discriminating that, when image of the eye area is displaced in a value exceeding a given value, the driver has undertaken said given action with his body thrust forward from a normal drive mode.

11. A vehicle surrounding monitoring system for a vehicle, comprising:

a vehicle surrounding circumstance discriminating system including a vehicle speed detection unit detecting a vehicle speed, an action detecting unit detecting a driver's action, and a surrounding circumstance discriminating unit discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action;

an image taking up unit taking up image of the vehicle surrounding in a dead angle of a driver;

a display unit providing a display of image of the vehicle surrounding taken up with said image taking up unit;

a current vehicle position detecting unit detecting a current vehicle position;

a memory unit storing a particular location of the poor visibility area detected with said current vehicle position detection unit when said surrounding circumstance discriminating unit discriminates that the vehicle travels across the poor visibility area; and a control unit operative to cause said image taking up unit to take up image and to cause the display unit to provide the display of image in response to the vehicle arriving at the particular location stored in said memory unit.

12. The vehicle surrounding monitoring system according to claim 11, wherein:

said action detecting unit includes a length detecting unit detecting a pull-out length of a seat belt and discriminates that, when a difference between the pull-out length of the seat belt, which is detected with said length detecting unit, and a pull-out length of the seat belt in a normal drive attitude exceeds a given value, the driver has undertaken said given action with his body thrust forward from a normal drive mode.

13. The vehicle surrounding monitoring system according to claim 11, wherein:

said action detecting unit includes a load detecting unit detecting a downward load exerted to a steering wheel and discriminates that, when the downward load detected with said load detecting unit exceeds a given value, the driver has undertaken said given action with his body thrust forward from a normal drive mode.

14. The vehicle surrounding monitoring system according to claim 11, wherein:

said action detecting unit includes a face image taking up unit taking up image of a face portion of the driver and a face extracting unit extracting output image of the face portion from image taken up with said face image taking up unit, said action detecting unit discriminating that, when a ratio of output image of the face portion occupied in an image screen exceeds a given value, the driver has undertaken said given action with his body thrust forward from a normal drive mode.

15. The vehicle surrounding monitoring system according to claim 11, wherein:

said action detecting unit includes a face image taking up unit taking up face image of a face portion of the driver and a face extracting unit extracting image of an eye area from said face image taken up with said face image taking up unit, said action detecting unit discriminating that, when image of the eye area is displaced in a value exceeding a given value, the driver has undertaken said given action with his body thrust forward from a normal drive mode.

16. A vehicle obstacle warning system, comprising:

a vehicle surrounding circumstance discriminating system including a vehicle speed detection unit detecting a vehicle speed, an action detecting unit detecting a driver's action, and a surrounding circumstance discriminating unit discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action;

an obstacle detecting unit detecting an obstacle present around the vehicle surrounding;

a warning unit issuing a warning signal upon detection of said obstacle; and a control unit operative to cause said obstacle detecting unit to detect said obstacle and to cause said warning unit to issue said warning signal when said surrounding circumstance discriminating unit discriminates that the vehicle travels across the poor visibility area.

17. A vehicle surrounding circumstance discriminating system for a vehicle, comprising:

means for detecting a vehicle speed;

means for detecting a driver's action; and means for discriminating a good or bad visibility area around a vehicle surrounding on the basis of the vehicle speed and the driver's action, wherein:

said surrounding circumstance discriminating unit discriminates that a vehicle travels across a poor visibility area upon detection of the vehicle speed decreasing below a given value and detection of a driver's given action.

18. A vehicle surrounding monitoring system for a vehicle, comprising:

a vehicle surrounding circumstance discriminating unit including means for detecting a vehicle speed, means for detecting a driver's action, and means for discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action;

means for taking up image of the vehicle surrounding in a dead angle of a driver;

display means for providing a display of image of the vehicle surrounding taken up with said image taking up unit; and control means operative to cause said display means to provide the display of image taken up with said image taking up means when said surrounding circumstance discriminating unit discriminates that the vehicle travels across the poor visibility area.

19. A vehicle surrounding monitoring system for a vehicle, comprising:

a vehicle surrounding circumstance discriminating unit including means for detecting a vehicle speed, means for detecting a driver's action, and means for discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action;

means for taking up image of the vehicle surrounding in a dead angle of a driver;

display means for providing a display of image of the vehicle surrounding taken up with said image taking up means;

means for detecting a current vehicle position;

means for storing a particular location of the poor visibility area detected with said current vehicle position detection means when said surrounding circumstance discriminating unit discriminates that the vehicle travels across the poor visibility area; and control means operative to cause said image taking up means to take up image and to cause the display means to provide the display of image in response to the vehicle arriving at the particular location stored in said memory means.

20. A vehicle obstacle warning system, comprising:

a vehicle surrounding circumstance discriminating unit including means for detecting a vehicle speed, means for detecting a driver's action, and means for discriminating a good or bad visibility area around a vehicle surrounding on the basis of the vehicle speed and the driver's action, wherein said surrounding circumstance discriminating unit discriminates that a vehicle travels across a poor visibility area upon detection of the vehicle speed decreasing below a given value and upon detection of the driver's action being aligned with a given action;

means for detecting an obstacle present around the vehicle surrounding;

means for issuing a warning signal upon detection of said obstacle; and control means operative to cause said obstacle detecting means to detect said obstacle and to cause said warning signal issuing means to issue said warning signal when said surrounding circumstance discriminating unit discriminates that the vehicle travels across the poor visibility area.

21. A method of discriminating a vehicle surrounding circumstance, comprising:

detecting a vehicle speed;

detecting a driver's action; and discriminating a good or bad visibility area around a vehicle surrounding on the basis of the vehicle speed and the driver's action, wherein:

said surrounding circumstance discriminating unit discriminates that a vehicle travels across a poor visibility area upon detection of the vehicle speed decreasing below a given value and detection of a driver's given action.

22. A method of monitoring a vehicle surrounding, comprising:

detecting a vehicle speed;

detecting a driver's action;

discriminating a good or bad visibility area around a vehicle surrounding on the basis of the vehicle speed and the driver's action when a vehicle travels across a poor visibility area upon detection of the vehicle speed decreasing below a given value and upon detection of the driver's action in alignment with a given action;

taking up image of the vehicle surrounding in a dead angle of a driver;

providing a display of image of the vehicle surrounding; and controlling said displaying step to be initiated for the display of image taken up in said image taking up step when said discriminating step discriminates that the vehicle travels across the poor visibility area.

23. A method of monitoring a vehicle surrounding, comprising:

detecting a vehicle speed;

detecting a driver's action;

discriminating a good or bad visibility area around a vehicle surrounding on the basis of the vehicle speed and the driver's action when a vehicle travels across a poor visibility area upon detection of the vehicle speed decreasing below a given value and upon detection of the driver's action in alignment with a given action;

taking up image of the vehicle surrounding in a dead angle of a driver;

providing a display of image of the vehicle surrounding taken up in said image taking up step;

detecting a current vehicle position;

storing a particular location of the poor visibility area detected in said current vehicle position detecting step when the vehicle travels across the poor visibility area; and controlling said image taking up step to be executed to take up image and said display providing step to be initiated to provide the display of image in response to the vehicle arriving at the stored particular location.

24. A method of warning a vehicle obstacle, comprising:

detecting a vehicle speed;

detecting a driver's action;

discriminating a good or bad visibility area around a vehicle surrounding on the basis of the vehicle speed and the driver's action when a vehicle travels across a poor visibility area upon detection of the vehicle speed decreasing below a given value and upon detection of the driver's action in alignment with a given action;

detecting an obstacle present around the vehicle surrounding;

issuing a warning signal upon detection of said obstacle; and controlling said obstacle detecting step to be executed to detect said obstacle and said warning signal issuing step to be initiated to issue said warning signal when said vehicle travels across the poor visibility area.

* * * * *